(12) United States Patent
Fujii et al.

(10) Patent No.: US 7,546,010 B2
(45) Date of Patent: Jun. 9, 2009

(54) LENS-INCORPORATING OPTICAL WAVEGUIDE, AND METHOD FOR MANUFACTURING THE SAME

(75) Inventors: Akira Fujii, Kanagawa (JP); Toshihiko Suzuki, Kanagawa (JP); Keishi Shimizu, Kanagawa (JP); Kazutoshi Yatsuda, Kanagawa (JP); Shigemi Ohtsu, Kanagawa (JP); Eiichi Akutsu, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 11/590,805

(22) Filed: Nov. 1, 2006

(65) Prior Publication Data

US 2007/0237454 A1 Oct. 11, 2007

(30) Foreign Application Priority Data

Apr. 10, 2006 (JP) ............................. 2006-107821

(51) Int. Cl.
*G02B 6/32* (2006.01)

(52) U.S. Cl. ....................................................... 385/33

(58) Field of Classification Search .................... 385/33
See application file for complete search history.

(56) References Cited

U.S. PATENT DOCUMENTS

| 2002/0114556 A1* | 8/2002 | Kato et al. ..................... 385/16 |
| 2004/0021237 A1* | 2/2004 | Shimizu et al. ............. 264/1.28 |
| 2004/0076375 A1* | 4/2004 | Imada et al. .................. 385/38 |

FOREIGN PATENT DOCUMENTS

| JP | 2000-039531 | * 7/1998 | ..................... 6/13 |
| JP | A 2000-39531 | 2/2000 | |
| JP | A 2002-333538 | 11/2002 | |
| JP | 2001-377327 | * 6/2003 | ..................... 6/13 |
| JP | 2003177264 A | * 6/2003 | |
| JP | B2 3665967 | 4/2005 | |

\* cited by examiner

*Primary Examiner*—Sung H Pak
*Assistant Examiner*—Hoang Tran
(74) *Attorney, Agent, or Firm*—Oliff & Berridge, PLC

(57) ABSTRACT

A lens-incorporating optical waveguide includes: a core; a clad enclosing the cores; and a lens provided in the core so as to cross a propagating direction of light.

19 Claims, 5 Drawing Sheets

LENS-INCORPORATING OPTICAL WAVEGUIDE, AND METHOD FOR MANUFACTURING THE SAME

BACKGROUND (i) Technical Field

The present invention relates to an optical waveguide and to a method for manufacturing the same, and more particularly, to a lens-incorporating optical waveguide having a lens provided in a core and to a method for manufacturing the same.

(ii) Related Art

In relation to an optical interconnection used for coupling optical devices together, one of the most important issues is how to reduce a coupling loss arising between the optical devices. For instance, when coupling of, e.g., an optical waveguide with an optical fiber, a semiconductor light-receiving-and-emitting element, and the like, is conceived, the following contrivances have been put into practice in order to reduce a coupling loss which arises for reasons of a difference in NA (Numerical Aperture).

First, there is an optical interconnection involving the use of a microlens. When optical fibers having different diameters are coupled together or when diverging light originating from a laser diode is caused to enter a waveguide, a microlens is interposed between the optical fibers or between the laser diode and the waveguide to thus collimate or converge light (or perform so-called conversion of an optical path), thereby attempting to reduce a coupling loss attributable to a difference in NA. However, this technique requires an additional lens, and therefore requires a cost hike incurred by the lens and precise positioning of the lens between elements which are to be coupled together by means of the lens, which in turn raises a problem of an increase in the number of steps.

Another optical interconnection has lens-shaped ends in an optical waveguide. The lens shape is formed by means of forming ends of an optical waveguide. For instance, a so-called hemispherically-ended fiber, which is formed by means of ends of an optical fiber being made hemispherical, is generally used. However, in relation to this optical fiber, the number of processes for machining the ends of a fiber increases, and high accuracy is required in position and curvature of the spherical ends, which in turn raises a problem of a cost hike.

SUMMARY

A lens-incorporating optical waveguide includes; a core; a clad enclosing the cores; and a lens provided in the core so as to cross a propagating direction of light.

BRIEF DESCRIPTION OF THE DRAWINGS

Exemplary embodiments of the present invention will be described in detail based on the following figure, wherein.

DETAILED DESCRIPTION

An exemplary embodiment of the present invention will be described in detail hereinbelow by reference to the accompanying drawings.

<Structure of Optical Waveguide>

Figure 1:
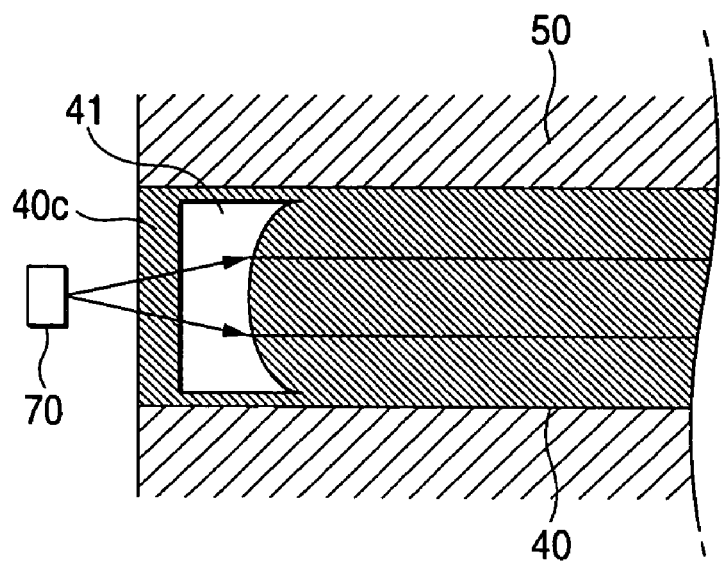
FIG. 1 is a fragmentary enlarged top view showing the structure of a lens-incorporating optical waveguide according to an example of the present invention.

First, the structure of a lens-incorporating optical waveguide according to an exemplary embodiment of the present invention will first be described by reference to FIG. 1. This drawing is a diagrammatic view showing the neighborhood of an incident end of a core (a waveguide core) 40 of an optical waveguide. A lens having a concave shape (a concave lens) 41 which differs from the waveguide core in terms of refractive index (specifically, a low refractive index) is disposed in a longitudinal end of the waveguide core 40 so as to cross the direction in which light propagates through the waveguide core 40. The waveguide core 40 is enclosed with a cladding material 50 whose refractive index is lower than that of the waveguide core 40. For instance, a light source 70, such as a laser diode, is disposed at the entrance side of the waveguide core 40 (at the left side of the drawing). Light originating from this light source has an angle of divergence and enters an entrance end 40c of the waveguide core 40. The light having thus entered is collimated by action of the lens 41 in the waveguide core 40. One face of the illustrated concave lens 41 is planar (i.e., a planoconcave lens). However, the lens of the present exemplary embodiment is not limited to the planoconvex lens, but can also be formed such that both planes of the lens are concave.

A material of the concave lens 41 can be arbitrarily selected. However, by means of selecting a material whose refractive index greatly differs from that of the waveguide core 40, a large angle of refraction; namely, a greater lens effect, can be achieved. When the ease of processes for manufacturing a material of the lens 41 is taken into consideration, selection of a gas is preferable. Especially, selection of air which serves as an atmosphere during manufacturing processes (i.e., a hollow lens) enables easier and more inexpensive manufacture of a lens, and selection of air is preferable in terms of cost. The shape of a lens is optically designed for implementing required conversion of an optical path.

According to a method for filling (sealing) the inside of a core material (a UV-curable resin or the like) with air, both ends of the previously-described hollow lens 41 become readily rounded, which sometimes causes failures. For instance, when a surface to be formed into a plane has been formed as a curved surface, the light whose propagating direction is to be converted (is to be subjected to refraction) by the hollow lens deviates from a desired conversion angle. Consequently, the thus-converted light leaks to a cladding layer or induces a mode of high order. The light exhibits a diverging effect.

Moreover, when the cross section of a plane perpendicular to the direction of propagation of light in the waveguide core 40 is larger than the cross section of a plane perpendicular to the direction of propagation of light in the hollow lens 41, a portion of the light propagating through the core does not pass through the lens, and propagating light that has not been collimated is present.

Figure 2:
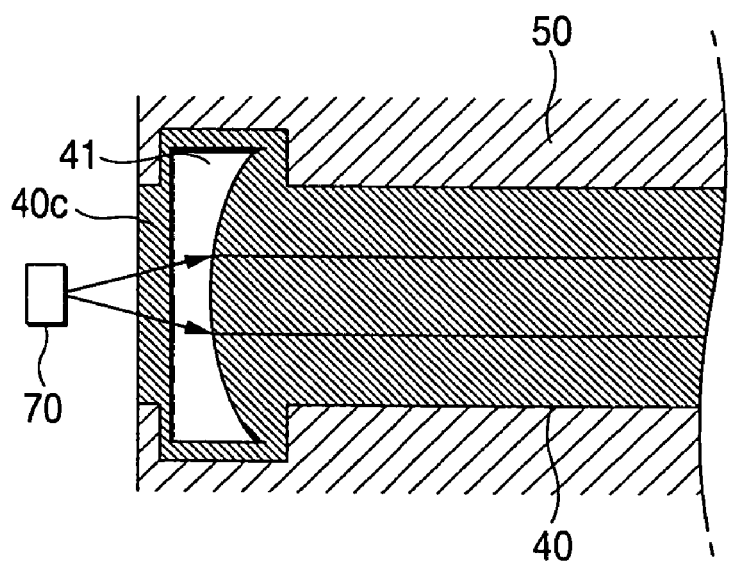
FIG. 2 is a fragmentary enlarged top view showing the structure of a lens-incorporating optical waveguide according to another example of the present invention.

In order to prevent occurrence of this problem, the present invention provides, as another exemplary embodiment, an optical waveguide having a structure such as that shown in FIG. 2. As illustrated, the structure of the optical waveguide is such that the cross section of the hollow lens 41 is made greater than that of the waveguide core 40 (the widthwise dimension of the lens 41 is made greater than the widthwise dimension of the core 40 by means of inflation in an illustrated embodiment). By means of such a structure, essentially all of the beam propagating through the waveguide core 40 from one end (e.g., the left end in the drawing) to the other end thereof can be caused to pass through the hollow lens 41. Thereby, adverse effect, particularly, on both ends of the hollow lens 41 can be diminished.

The optical waveguide of the present invention, whose structure has been described above, is preferably used in a multimode.

According to the lens-incorporating waveguide of the present invention, the lens is present in the waveguide, which particularly yields the following advantage.

Generally, when a light-emitting element and a waveguide are coupled together, an adhesive is frequently used. At this time, from the viewpoint of a loss, an adhesive having a refractive index identical with or analogous to that of the waveguide core is used. In the case of a waveguide in which a lens is formed at each of the end faces thereof, when an adhesive contacts a lens portion, the lens formed on the end face fails to exhibit a desired lens function. In contrast, in the lens-incorporating waveguide such as that described in connection with the present invention, a lens is incorporated, and hence an adhesive is prevented from adhering to the lens; namely, the lens is not subjected to adverse effect of the adhesive.

In a waveguide in which a lens is formed at each of the end faces of a waveguide, a lens becomes exposed (a lens face becomes exposed to the outside), and hence external adherents, such as dust, sometimes adversely affect the function of the lens. In contrast, according to the structure of the present invention, the lens is disposed in the core and is completely isolated from the outside. Therefore, no external dust adheres to the lens.

In addition, in a waveguide in which a lens is formed at each of the end faces of the waveguide, a light-emitting element and a waveguide are implemented with high accuracy with a predetermined positional relationship, on the basis of the angle of divergence of light from the light-emitting element and a distance estimated from the function of the lens. At that time, a spacer or the like is required, which in turn leads to an increase in the number of processes and components and, by extension, a cost hike. Meanwhile, in the waveguide of the present invention, a lens is formed in the waveguide at a distance previously determined by design from the angle of divergence and a lens function. Hence, the waveguide can be readily positioned by means of merely being abutted against the light-emitting element. The waveguide of the present invention is desirable in view of a reduction in the number of processes and the number of components; and is advantageous in terms of cost. The positional accuracy of a lens in the waveguide is determined by the accuracy of a mold used in the method for manufacturing a waveguide. Hence, high positional accuracy can also be achieved.

<Method for Manufacturing an Optical Waveguide>

A method for manufacturing an optical waveguide of the present invention will now be described.

There will first be described a method for filling a cavity forming the lens formed within the waveguide core 40 with a gas, to thus constitute the lens 41.

The method for manufacturing an optical waveguide of the present invention comprises the steps of:

(1) forming, on a substrate for use as an undercladding, a core having therein a cavity for a lens;

(2) coating the side faces and top of the core with a curable cladding material—which remains unhardened—in an atmosphere of a gas which is caused to be present in the cavity while the cavity still remains in the core; and (3) curing the curable cladding material by means of heat or light, to thus seal the material in the cavity.

The process of forming, on the undercladding substrate in step (1), a core having a cavity therein can include the following steps (a) to (e):

(a) preparing a mold which is formed from a cured resin layer of curable resin for use in forming a mold and which has an indentation portion corresponding to a protruding portion of the waveguide core and a protruding portion corresponding to the cavity;

(b) bringing a cladding substrate into intimate contact with the mold:

(c) filling, with curable resin for use in forming a core, an indentation portion of the mold remaining in intimate contact with the cladding substrate;

(d) curing the filled curable resin used for forming cores, by means of heat or light; and (e) removing the mold from the cladding substrate, to thus form on the cladding substrate a core having a cavity therein.

According to the above method for manufacturing the optical waveguide, formation of a cavity does not require an additional process, such as an etching process, and facilities therefor. Since a cavity is formed simultaneously with formation of a waveguide core, the waveguide core can be fabricated readily. Under this method for manufacturing an optical waveguide, a plane of the core forming a lens with respect to the cavity depends on the accuracy of a plane of the mold corresponding to the cavity. Hence, the accuracy of a lens plane can be readily enhanced by means of improving the plane accuracy of the mold.

Next, details of a preferred mode of process (1); namely, processes (a) to (e), will be described by reference to FIGS. 3 and 4. In order to simplify descriptions, the cavity is omitted from these drawings. FIGS. 3A to 3E are conceptual renderings showing respective processes of the manufacturing method of the present invention. FIG. 4 is a perspective view showing that a mold is brought in intimate contact with a substrate for cladding which is larger in size than the mold (i.e., the process shown in FIG. 3D).

Figure 3A:
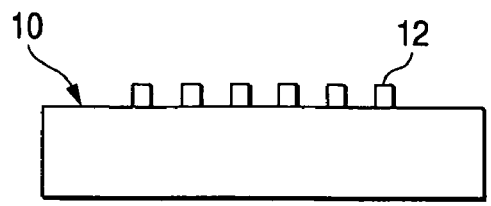
FIGS. 3A to 3G are process descriptive views showing details of a method for creating cores under the manufacturing method of the present invention.
Figure 3B:
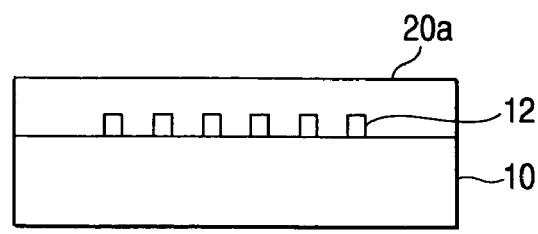
Figure 3C:
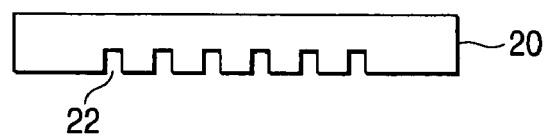
Figure 4:
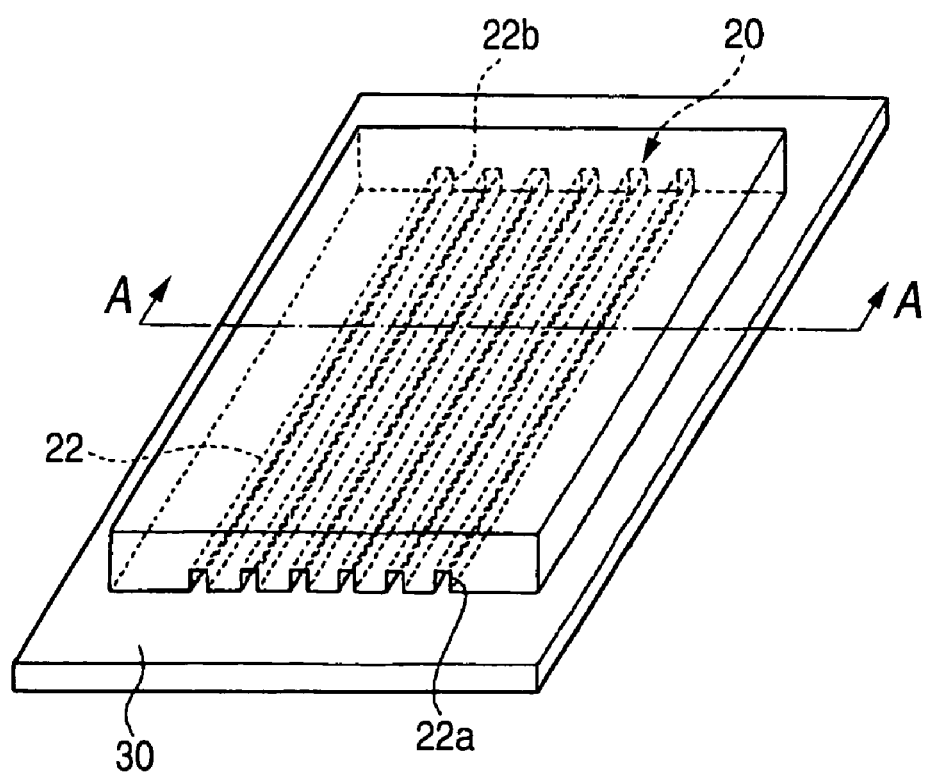
FIG. 4 is a perspective view showing that a mold remains in intimate contact with a base material for cladding purpose under the manufacturing method of the present invention.

First, FIG. 3A shows a cross-sectional view of a master mold 10 on which are fabricated protuberances 12 corresponding to optical waveguide cores and which is taken along a direction at right angles to the longitudinal direction of the protuberances 12. As shown in FIG. 3B, a cured resin layer 20a is formed, from curable resin used for forming a mold, on the surface of the master mold 10 on which the protuberances 12 are formed. FIG. 3B shows a cross-sectional plane taken by means of slicing the cured resin layer 20a of a curable resin for use in forming a mold, formed over the master mold 10, along the direction at right angles to the longitudinal direction of the protuberances 12. The cured resin layer 20a of a curable resin for use in forming a mold is removed from the master mold 10, to thus take a mold 20 out of the master mold. Both longitudinal ends of the mold 20 are cut such that the indentations 22 become exposed, thereby forming inlet ports 22a (see FIG. 4) used for filling the indentations 22 with curable resin used for forming cores and outlet ports 22b (see FIG. 4) used for discharging the resin from the indentations 22 corresponding to the protuberances 12. Thus, the mold 20 whose cross section is shown in FIG. 3C is fabricated.

Figure 3D:
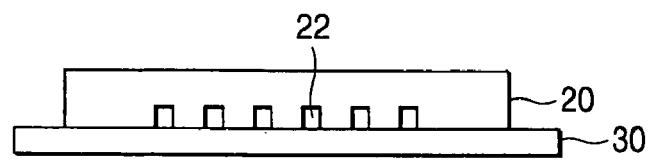
Figure 3E:
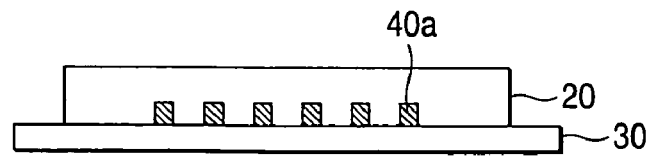

Subsequently, the thus-fabricated mold 20 is brought into intimate contact with a base material for cladding purpose 30 (see FIG. 3D and FIG. 4). FIG. 3D shows a cross-sectional view of the mold 20 and the base material 30, which are brought into intimate contact with each other and are sliced at right angles to the longitudinal direction of the indentations (a cross-sectional view taken along line A-A in FIG. 4). A curable resin 40a used for forming cores is filled in the indentations 22 of the mold from the inlet ports 22a of the mold 20, by utilization of capillarity. The curable resin 40a for forming a core is discharged from the outlet ports 22b (see FIG. 4) formed at the other end of the indentations 22. FIG. 3E shows a cross-sectional view taken by means of cutting, in a direction at right angles to the longitudinal direction of the indentations, the mold 20 while the indentations thereof are filled with the curable resin.

Figure 3F:

Subsequently, the curable resin used for forming cores, which has been filled in the indentations 22 of the mold 20, is cured, and the mold 20 is subsequently removed. FIG. 3F shows a cross-sectional view formed by means of slicing a substrate for cladding—on which optical waveguide cores 40 are formed—along a direction at right angles to the longitudinal direction of the core.

Figure 3G:
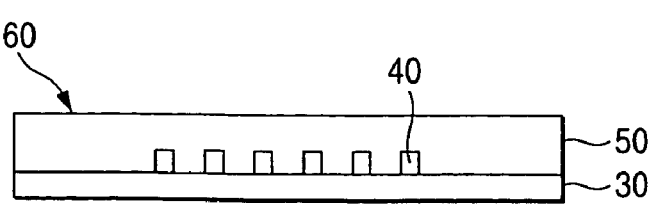

In the present invention, when the cavity that is to form a lens (designated by reference numeral 41 in FIG. 1) is filled with a gas, a high-viscosity cladding material is applied over the surface of the substrate for cladding purpose, on which cores are to be fabricated, in the atmosphere of the gas. By means of high viscosity of the cladding material, the cladding material is hindered from entering the cavity, and a cladding layer 50 is formed while a lens is formed within the optical waveguide core 40. Subsequently, an optical waveguide 60 is formed by means of curing the applied cladding resin. When the cavity that is to form a lens is filled with a cladding material, the cladding material is applied over the side faces and the upper face of each of the optical waveguide cores 40. In a decompressed environment, the gas in the cavity is degassed, and the cavity is filled with a cladding material. Subsequently, the thus-applied cladding resin is hardened, to thus fabricate an optical waveguide 60. FIG. 3G shows a cross-sectional view taken by means of cutting the thus-fabricated polymeric optical waveguide 60 along a direction at right angles to the longitudinal direction of the cores.

A preferred mode of process (a) will be described in detail hereunder.

<Manufacture of the Master Mold>

Figure 5:
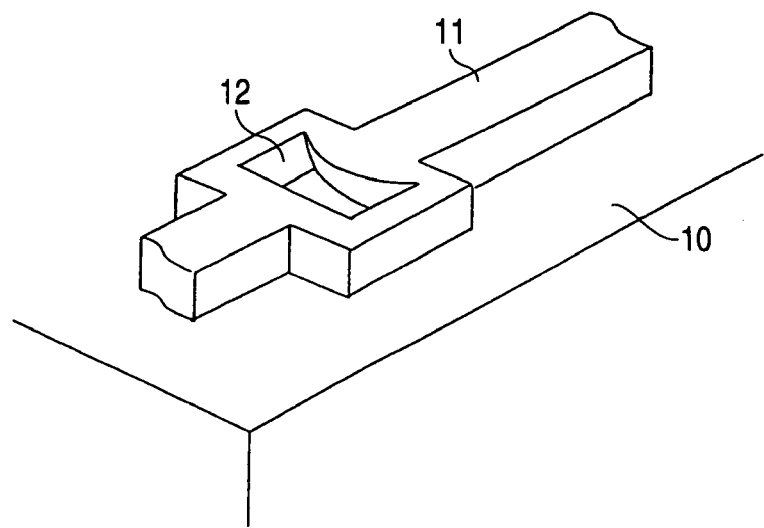
FIG. 5 is a fragmentary enlarged perspective view showing the surface profile of a master mold formed for creating a mold under the manufacturing method of the present invention.

As shown in FIG. 5, preferred manufacture of the mold in the process (a) is performed by use of the master mold 10 in which are formed the indentations 12 used for forming the hollow lens, along with the protuberances 11 corresponding to the optical waveguide cores. A related-art method; e.g., photolithography, can be used for forming protuberances and indentations without involvement of any specific limitations. Likewise, the method for fabricating a polymeric optical waveguide by means of electro-deposition or photoelectro-deposition, on which a patent has previously been filed by the present inventors, (see JP-A-2002-333538), can also be applied to manufacture of this master mold. The size of the protuberance 11 corresponding to the optical waveguide core to be formed is determined as appropriate according to the application of a polymeric optical waveguide and the like. For instance, in the case of an optical waveguide for single mode purpose, there are generally used cores, each of which has a square cross section measuring about 10 μm per side. In the case of an optical waveguide for multimode purpose, there are usually used cores, each of which has a square cross section measuring about 50 to 100 μm per side. However, according to an application, there may also arise a case where an optical waveguide has much larger cores, each of which has a square cross section measuring hundreds of micrometers per side. The present invention is not limited in terms of the size of the core.

<Manufacture of Mold>

Figure 6:
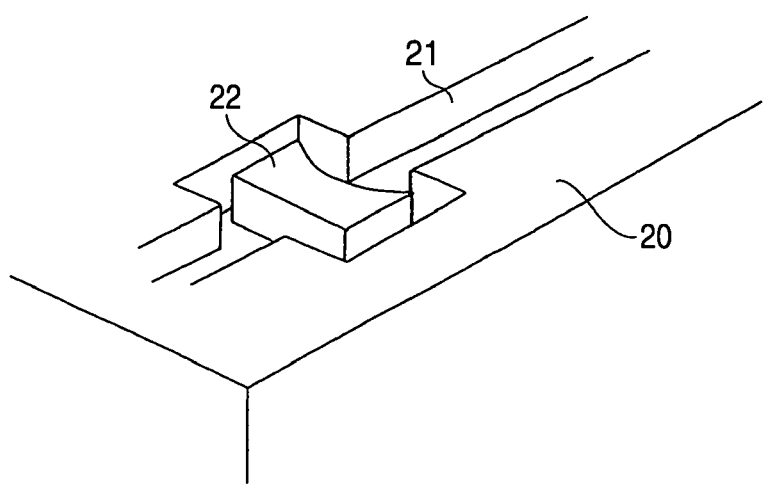
FIG. 6 is a fragmentary enlarged perspective view showing a surface profile of the mold created under the manufacturing method of the present invention.

Curable resin used for forming a mold is applied over or cast on the surface of the thus-formed master mold 10 where the protuberances 11 corresponding to optical waveguide cores and the other surface of the same where the indentations 12 corresponding to the cavities are formed. After having been left for a given period of time, the curable resin is subjected to vacuum defoaming for about ten minutes. After having been subjected to drying when necessary, the curable resin is cured. Next, the cured resin layer is removed, whereby the mold 20 is manufactured. As shown in FIG. 6, the indentations 21 corresponding to the optical waveguide cores and the protuberances 22 corresponding to the cavities are formed in the surface of the thus-manufactured mold 20.

As will be described later, there are formed inlet ports for filling the mold with a curable resin employed in forming a core and outlet ports for discharging resin or drawing in resin by suction at low pressure. No specific limitations are imposed on a method for forming the inlet ports and the outlet ports. For instance, the mold can also be manufactured by means of forming protuberances corresponding to inlet ports and outlet ports in the master mold in advance. Another, simpler method is to form in the master mold a curable resin layer used for forming a mold and to remove a cured resin layer from the master mold, thereby pulling a mold out. Subsequently, both ends of the thus-formed mold are cut such that the indentations formed in the surface of the mold come into communication with the outside, to thus form inlet ports and outlet ports.

Preferably, curable resin used for forming a mold enables easy removal of a cured material from the master mold (1); has a given level or more of mechanical strength and dimensional stability on the premise of repeated use of the mold (2); has stiffness (hardness) which sustains the shape of indentations and protuberances (3); and has superior adhesion with a substrate for cladding (4). Various additives can be applied to the curable resin used for forming a mold, as necessary.

The thickness of the cured resin layer is determined, as appropriate, in consideration of ease of handling of a mold. A thickness of about 0.1 mm to 50 mm is usually appropriate. In addition, performing mold-releasing operation for previously applying a mold-releasing agent to the original mode to thus promote removal of a mold from the master mold is desirable.

Moreover, the curable resin used for forming a mold can be applied or cast over the surface of the master mold, and the protuberances 11 corresponding to respective optical waveguide cores and the indentations 12 corresponding to hollow lenses, both of which are formed in the master mold, must be accurately transferred. For this reason, the curable resin used for forming a mold preferably possesses viscosity of a certain limit or less; e.g., a viscosity of 500 to 7000 mPa·s. The "curable resin used for forming a mold" employed herein includes a curable resin which turns into an elastic rubber-like substance after having been cured. Addition of a solvent for controlling viscosity to such an extent that adverse effect of the solvent is not exhibited is also possible.

From the above-described viewpoints of ease of removal, mechanical strength and dimensional stability, hardness, and adhesion to a substrate for cladding purpose, curable organopolysiloxane, which turns into silicone rubber (silicon elastomer) or silicon resin after having been cured, is preferably used as curable resin for use in forming a mold. The curable organopolysiloxane preferably contains in molecules thereof a methylsiloxane group, an ethylsiloxane group, or a phenylsiloxane group. The curable organopolysiloxane may be a one-pack type or a two-pack type which is used in combination with a curing agent. Moreover, the curable organopolysiloxane may also be of a thermosetting type or a room-temperature-curing type (e.g., curable organopolysiloxane which becomes hardened by moisture content in the air). The curable organopolysiloxane may also be of a type which utilizes another curing phenomenon (e.g., UV curing or the like).

The curable organopolysiloxane is preferably of a type which turns into silicone rubber after having become cured. To this end, curable organopolysiloxane called liquid silicone rubber (the term "liquid" encompasses a paste-like substance having high viscosity) is usually used. Curable organopolysiloxane of a two-pack type which is used in combination with a curing agent is preferable. Of curable organopolysiloxane of two-pack types, additional liquid silicone rubber is preferably used, for the following reasons. Specifically, the surface and inside of the liquid silicone rubber are cured uniformly in a short period of time; by-products are not generated or are generated in small amounts during curing of the silicone rubber; and the silicone rubber is superior in terms of ease of removal and exhibits a small shrinkage percentage. Of the liquid silicone rubbers, liquid diemthylsiloxane rubbers are especially preferable in terms of adhesion, ease of removal, strength, and hardness.

From the viewpoint of accurate transfer of the protuberances corresponding to the optical waveguide cores and the indentations corresponding to the cavities, a reduction in the mixture of air bubbles, and facilitated vacuum defoaming and formation of a mold to a thickness of several millimeters, liquid silicone rubber having a viscosity of 500 to 7000 mPa·s or thereabouts is desirable; and liquid silicone rubber having a viscosity of 2000 to 5000 mPa·s or thereabouts is more desirable. Moreover, in terms of adhesion to a substrate, the surface energy of the mold preferably ranges from 10 dyn/cm to 30 dyn/cm, more preferably from 15 dyn/cm to 24 dyn/cm.

From the viewpoint of profiling performance, maintenance of an indented shape, and ease of removal, the Shore hardness of rubber of a mold preferably ranges from 15 to 80, more preferably from 20 to 60. Particularly, in terms of profiling performance, the surface roughness of a mold [root mean square (RMS)] is preferably 0.2 μm or less, more preferably 0.1 μm or less.

In addition, the mold preferably exhibits light transmission in the UV range and/or the visible range. The reason why the mold preferably exhibits light transmission in the visible range is so that the mold can be readily positioned when being brought into intimate contact with a substrate for cladding purpose in process (b), or the way to fill the indentations of the mold with curable resin used for forming cores in process (c) can be observed, and so that completion of filling of resin or the like can be readily ascertained. The reason why the mold preferably exhibits light transmission in the UV range is that, when UV curable resin is used as curable resin for use in forming cores, the resin is exposed to UV radiation through the mold. To this end, the transmissivity of the mold in the UV range (from 250 nm to 400 nm) is 80% or more.

Liquid silicone rubber which turns into silicone rubber after having been cured, from among the curable organopolysiloxanes, also exhibits mutually-contradictory characteristics; namely, adhesion and removal of the silicone rubber with and from a substrate for cladding purpose; and also has the capability of duplicating a nano-structure. For these reasons, intrusion of a liquid can also be prevented by means of bringing the silicon rubber into intimate contact with the substrate for cladding purpose. Moreover, the mold using such silicone rubber transfers the master mold with high accuracy and also comes into intimate contact with the substrate for cladding purpose. Therefore, the side faces of cores formed by the mold (i.e., an interface with surrounding clads) and an interface forming a plane between the core and the hollow lens are considerably superior. Moreover, only indentations formed between the mold and the substrate for cladding purpose can be efficiently filled with resin used for forming cores. In addition, removal of the substrate for cladding purpose from the mold is also easy. Consequently, a molecular optical waveguide maintaining its shape with high accuracy can be manufactured by the mold with considerable ease.

Moreover, the cured resin layer can be replaced with another material having high rigidity. Among other things, when the cured resin layer possesses rubber elasticity, portions of the cured resin layer; namely, the cured resin layer other than areas thereof which transfer protuberances and indentations of the master mold, can be replaced with another material having high rigidity. In this case, a handling characteristic of the mold is enhanced.

Process (b) will now be described in detail.

<Substrate for Cladding Purpose>

Process (b) is a process for bringing a substrate 30 for cladding purpose into intimate contact with the mold (see FIG. 3D). However, a material for the substrate in whose surface an optical waveguide is fabricated is appropriately selected according to the application of the substrate in consideration of optical characteristics of a material, such as a refractive index, light transmissivity, or the like, as well as mechanical strength, heat resistance, flexibility (a flexing characteristic), and the like For instance, when a flexible polymeric optical waveguide is fabricated, use of a flexible film base material is preferable.

Such flexible film materials include, e.g., acrylic resins (polymethylmethacrylate, and the like), alicyclic-acrylic resins, styrene-based resins (polystyrene, acrylonitrile-styrene copolymer, and the like), olefin-based resins (polyethylene, polypropylene, ethylene-propylene copolymer, and the like), alicyclic olefin resins, vinyl-chloride-based resins, vinylidene-chloride-based resins, vinyl-alcohol-based resins, vinyl-butyral-based resins, arylate-based resins, fluorine-containing resins, polyester-based resins (polyethylene terephthalate, polyethylene naphthalate, and the like) polycarbonate-based resins, cellulose diacetate/cellulose triacetate, amide-based resins (aliphatic polyamide, aromatic polyamide, and the like), imide-based resins, sulfonic resins, polyether sulfonic resins, polyether-etherketone-based resins, polyphenylene-sulfide-based resins, polyoxymethylene-based resins, blends thereof, and the like.

For example, OZ-1000, OZ-1100 (manufactured by Hitachi Chemical Co., Ltd.), or the like, which is made by introducing aliphatic cyclic hydrocarbon, such as tricyclodecane, into an ester substituent, is used as the above-described alicyclic-acrylic resin.

The above alicyclic olefin resins include, e.g., an olefin resin having a norbornene structure at the principal chain, an olefin resin having a norbornene structure at the principal chain and a polar group, such as a alkyloxycarbonyl group (the alkyl group includes alkyls having one to six carbons or a cycloalkyl group), or the like, at a side chain. As mentioned above, among these alicyclic olefin resins, the alicyclic olefin resin having a norbornene structure at the principal chain and a polar group, such as alkyloxycarbonyl group, at a side chain has a low refractive index (a refractive index is 1.50 or thereabouts, and a sufficient difference between the refractive index of a core and that of a clad can be ensured); exhibits high light transmission and superior optical characteristics; and exhibits superior adhesion to a mold and superior heat resistance, as well. Therefore, the olefin resin having a norbornene structure at the principal chain and a polar group at a side chain is suitable for manufacture of the polymeric optical waveguide of the present invention. In order to ensure a difference in refractive index between the core and the base material, a material having a refractive index of 1.55 or less, preferably a refractive index of 1.53 or less, is desirable.

A so-called clad base material; namely, a substrate which is coated with a cladding material, can also be utilized as the base material for cladding purpose. Even in this case, the flatness of the base material can be enhanced. Further, by means of coating of a cladding material, a material which would otherwise be unsuitable for use as a cladding material because of high birefringence, or a material exhibiting low transparency, can also be utilized.

Subsequently, process (c) will be described in detail.

As shown in FIG. 4, in process (c), curable resin 40a used for forming cores is injected to fill indentations of the mold 20 from the inlet ports 22a of the mold by means of capillarity (see FIG. 3E). Meanwhile, the curable resin 40a for use in forming a core injected into the indentations of the mold 20 is drawn at low pressure by suction from the outlet ports 22b of the mold, thereby discharging the filled curable resin for forming a core. For instance, a radiation curing resin, an electron radiation curing resin, a thermosetting resin, and the like, can be used as a curable resin for use in forming cores. Among these resins, a UV radiation curing resin and thermosetting resin are preferably used.

<UV Radiation Curing Resin or Thermosetting Resin for Use in Forming Cores>

A UV radiation curing monomer, a UV radiation curing oligomer, a thermosetting monomer, a thermosetting oligomer, or a mixture of the monomer and the oligomer, is preferably used as the UV ration curable resin or thermosetting resin for use in forming a core. Further, an epoxy-based UV radiation curing resin, a polyimide-based UV radiation curing resin, and an acrylic UV curing resin are preferably used as the UV setting resin.

As mentioned previously, the curable resin for use in forming cores fills clearance (a recess of the mold) formed between the mold and the base material, by means of capillarity. A curable resin used for forming a core must have a low viscosity sufficient for enabling filling of the resin. Accordingly, the viscosity of the curable resin ranges, e.g., from 10 mPa·s to 2000 mPa·s; preferably from 20 mPa·s to 1000 mPa·s; and more preferably from 30 mPa·s to 500 mPa·s. In addition, in order to replicate the original shape with high accuracy, the protuberances corresponding to the optical waveguide cores and the indentations corresponding to the cavities, which are formed in the master mold, are required to cause small volumetric changes before and after the curable resin is cured. For instance, when a large volumetric change has arisen; particularly, when the volume has decreased, the decrease induces a loss in a waveguide. Accordingly, the curable resin that induces the minimum volumetric changes is desirable. More specifically, the volumetric changes is 10% or less, and more preferably 6% or less. Making the viscosity of the curable resin low by use of a solvent induces a large volumetric change before and after the curable resin is cured. For this reason, use of a solvent is preferably avoided if possible.

In order to reduce a volumetric change (contraction) in a curable resin used for forming cores, which will arise after the curable resin has been cured, for example, polymer can be added to the resin. Preferably, the polymer has compatibility with a curable resin used for forming cores, and does not impose adverse effect on the refractive index, elasticity, and transmission property of the resin. Addition of polymer enables lessening of a volumetric change and, further, sophisticated control of the viscosity of polymer and a glass transition point of the cured resin. For example, acrylic polymers, methacrylic polymers, or epoxy-based polymers can be used as the polymer. However, the polymer of the present invention is not limited to these polymers.

In relation to the curable resin used for forming cores, the refractive index of a hardened resin must be greater than the refractive index of the base material [including a cladding layer formed in process (d) provided below] which is to serve as a clad. For instance, the refractive index is 1.50 or more, preferably, 1.53 or more. A difference between the refractive index of the clad cured in process (d) described below and the refractive index of the core is 0.01 or more, preferably 0.03 or more.

In this process, in order to promote filling of the indentations of the mold with the curable resin used for forming cores by means of capillarity, the entire system is depressurized (to about 0.1 to 20 kPa). Alternatively, drawing the curable resin by suction via through holes (corresponding to, i.e., the outlet ports set forth) is desirable. In addition to depressurization of the entire system, the curable resin injected for filling from the inlet ports of the mold is also heated to thus render the viscosity of the curable resin much lower in order to promote the above-described filling operation. This is also an effective measure.

Process (d) will now be described.

In process (d), the injected curable resin used for forming cores is cured. In order to cure the UV radiation curing resin, for example, a UV lamp, a UV LED, a UV radiation device, or the like, is used. Alternatively, in order to cure thermosetting resin, the resin can be heated in, e.g., an oven.

Finally, process (e) will be described.

In process (e) subsequent to process (d), the thus-formed mold 20 is removed from the base material 30 for cladding purpose.

Through the above processes, cores 40—a cavity (a hollow lens 41) is formed in each of the cores—are formed. Although the manufacturing method that has been described in detail above is preferable, the method for manufacturing on a substrate cores having cavities therein is not limited to this. Another method; for example, a direct exposure method, an etching method, and the like, can also be applied. However, from the viewpoint of cost and easiness, selection of the above-described method is preferable.

A preferable process for Process (2) will be described hereunder in detail.

In process (2), a clad layer 50 is additionally formed over the film base material 30 in which the cores are fabricated therein in process (1).

Using a highly-viscous curable resin as a clad material is preferable as a technique for applying a clad material, which remains unhardened, over the side faces and tops of the cores acquired in process (1) while the cavities of the indented hollow lenses 41 formed in the protruding cores 40 are maintained. Specifically, by means of such a highly-viscous curable resin, a nonsolid clad (an unhardened clad) applied over the side faces and tops of the cores does not intrude into the cavities, and therefore a gas can be trapped in the cavities in the cores which are to serve as lenses. Moreover, in order to well form cavities which are to serve as lenses, a highly-viscous curable resin is used. However, from the viewpoint of compatibility between productivity and moldability, the viscosity preferably ranges from 30 mPa·s to 3000 mPa·s. Moreover, from the view point of yield, the viscosity more preferably ranges from 100 mPa·s to 2000 mPa·s.

The optical waveguide of the present exemplary embodiment has a structure where the atmosphere (the air or another gas) is trapped as a medium directly in the cavity of the hollow lens 41. Therefore, it is better to implement processing pertaining to process (2) in the atmosphere of a gas which is to be trapped in the cavities. Utilizing air as the gas to be trapped in the cavities is particularly desirable, because air can be acquired most easily and inexpensively.

Alternatively, in lieu of air, a substance identical with the clad material enclosing the cores that form the waveguide can also be used for filling as the medium to be trapped in the cavities 41 which are to form the lenses in the cores. When such a material is injected, a clad material is applied over the side faces and tops of the cores, and subsequently the gas in the cavities is subjected to defoaming in a depressurized environment. In this case, the limitation required by the above structure that traps a gas as a medium is not imposed on the viscosity of the clad material. In this case, in other words, use of the above-mentioned UV curing resin or the thermosetting resin is preferable. For instance, a UV radiation curing monomer, a UV radiation curing oligomer, a thermosetting monomer, a thermosetting oligomer, or a mixture of the monomer and the oligomer, is used as a curable resin for cladding purpose. In that case, in order to reduce a volumetric change (contraction) in a curable resin used for forming a clad, which will arise after the curable resin has been cured, a polymer—which has compatibility with a curable resin used for forming cores and which does not impose adverse effect on the refractive index, elasticity, and transmission property of the resin; for example, a methacrylic polymer or an epoxy-based polymers—can also be added to the resin.

In order to reduce a volumetric change (contraction) in the UV curing resin or the thermosetting resin, which will arise after the resin has been cured, a polymer analogous to the polymer added to the clad layer can also be added. In that case, in order to ensure a required difference between the refractive index of the clad layer and that of the core, the refractive index of the clad layer is preferably 1.55 or less, more preferably 1.53 or less. Moreover, the smaller the difference between the refractive index of the base material for cladding purpose and that of the clad layer, the more desirable. In this case, from the viewpoint of entrapment of light, the difference is 0.05 or less, more preferably 0.001 or less, and much further preferably zero.

Under the above method for manufacturing an optical waveguide, liquid dimethyl cyclohexane rubber, among liquid silicone rubbers which enter a rubber state after having been hardened, is particularly preferably used as a curable resin used for forming a mold. Meanwhile, an alicyclic olefin resin having a norbornene structure at the principal chain and a polar group, such as an alkyloxycarbonyl group, at a side chain is used as a base material for cladding purpose. Such a combined usage of the liquid silicone rubber and the alicyclic olefin resin is preferable. By means of this combination, especially high adhesion between the curable resin and the base material is achieved, and the structure of indentations of the mold is not deformed. Moreover, even when the cross-sectional area of the indented structure is small (e.g., a rectangular cross section measuring 10 μm×10 μm), the indentations can be quickly filled with curable resin by means of capillarity.

Finally, details on process (3) will be described hereinbelow.

In process (3) subsequent to process (2), the clad material is cured by heat or light, thereby yielding the clad layer 50. As a result, the gas is trapped in a cavity which is to form a lens. Alternatively, the cavity is filled with another medium and cured, so that an optical waveguide having a lens formed therein can be completed.

In order to harden a UV radiation curing resin serving as a clad material, a UV radiation lamp, a UV radiation LED, a UV radiation device, and the like is used. Moreover, in order to harden a thermosetting resin, for example heating in an oven, or the like, is used.

Figure 7A:
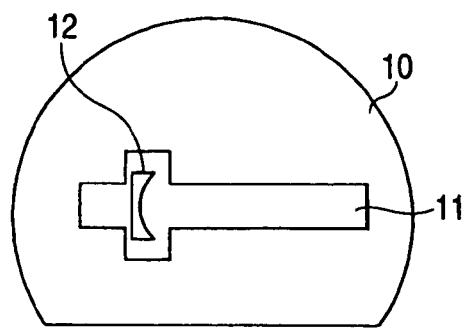
FIGS. 7A to 7C are view showing a specific example method for manufacturing the lens-incorporating optical waveguide of the present invention.
Figure 7B:
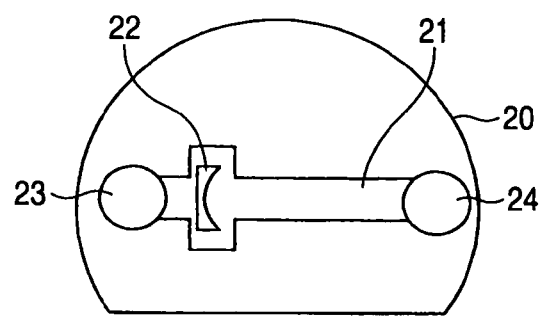
Figure 7C:
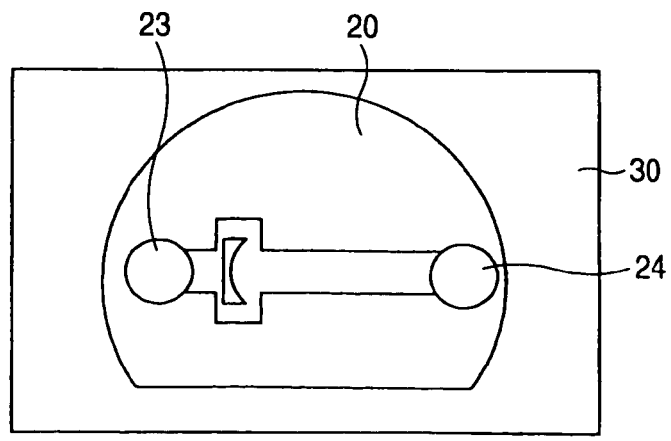

For instance, as shown in FIGS. 7A to 7C, under the method for manufacturing an optical waveguide, the protuberances 11 used for forming optical waveguide cores are formed in the surface of; e.g., a silicon wafer (an Si substrate) 10 serving as the previously-described master mold, and the indentations 12 used for forming hollow lenses are formed in portions of the protuberances 11 (see FIG. 7A). Subsequently, the mold 20 removed from the master mold 10 is obtained (see FIG. 7B). At that time, through holes 23, 24 in mutual communication are formed at respective ends of the indentation 21 corresponding to the protuberance 11 used for forming an optical waveguide core. The through holes 23, 24 are taken as inlet and outlet ports used for injecting or discharging the curable resin used for forming cores into or out of the mold 20. The thus-created mold 20 is brought into intimate contact with the surface of the base material 30 for cladding purpose (see FIG. 7C). A curable resin for use in forming cores is injected into one of the through holes, and the thus-injected resin is concurrently drawn by suction from the other through hole by means of depressurization, whereby the indentations of the mold are preferably, sufficiently filled with the curable resin. The curable resin for use in forming cores is injected by use of such a mold, a filling rate can be considerably increased, and adhesion between the mold and the base material is enhanced further. Moreover, mixing of air bubbles can be avoided.

The through hole 23 formed in an area from which the curable resin for use in forming cores is to enter has the reservoir function for holding a fluid (a curable resin used for forming cores). The through hole 24 formed in an area from which the curable resin for use in forming cores is to be discharged is used for depressurized suction for depressurizing the indentation of the mold 20 when the indentations of the mold are filled with the resin. No specific limitations are imposed on the shape and size of the through hole 23 provided on the inlet side, so long as the through hole is in mutual communication with the inlet end of the indentation and has the reservoir function. Moreover, no specific limitations are imposed on the shape and size of the through hole 24 provided on the outlet side, so long as the through hole is in mutual communication with the discharge end of the indentation and can be used for depressurization suction.

As mentioned above, the through hole 23, which is formed at the end of the indentation of the mold 20 and located at the area where the curable resin used for forming cores enters, has the reservoir function. Accordingly, for instance, the mold 20 is formed in such a manner that the cross-sectional area of the mold contacting the base material is large when the mold 20 is brought into intimate contact with the surface of the base material 30 for cladding purpose, and that the cross-sectional area becomes smaller with increasing distance from the base material. As a result, the mold can be readily removed from the base material after the indentations have been filled with the curable resin for use in forming cores and the curable resin has been cured. The through hole 24 located at the area where the curable resin is discharged does not need to be given the above reservoir function, and particularly does not require adoption of such a cross-sectional structure.

In relation to the mold 20 having the through holes 23 and 24, a mold—in which the indentations 21 corresponding to the protuberances of the optical waveguide cores and the protuberances 22 corresponding to the cavities are formed—is created; and subsequently the mold is, for example, punched into a predetermined shape, so that the through holes 23, 24 can also be formed. At that time, the inside of the through hole 23 is punched such that the inlet port (see reference 22a shown in FIG. 3) used for injecting a curable resin used for use in forming core appears, and the inside of the through hole 24 is punched such that the outlet port (see reference numeral 22b in FIG. 3) used for discharging the curable resin for use in forming cores appears. Even in the case of the punched through hole, good adhesion is achieved between the mold and the base material for cladding purpose, and a clearance is not formed between the base material and the mold except for the indentations of the mold. Accordingly, the curable resin for use in forming cores does not flow to areas other than the indentations However, as mentioned previously, in addition to being formed by eliminating (punching) all of the curable resin layer used for forming the mold 20 in a thicknesswise direction thereof, the through holes 23, 24 may be formed in such a way that portions of the mold are left in the thicknesswise direction thereof. In this case, the mold is located under the substrate for cladding purpose such that the through holes are exposed.

Another method for creating a mold having the through holes 23, 24 is to create, on the master mold, protuberances used for forming the through holes 23, 24 (the height of the protuberance is made greater than the thickness of a cured resin layer formed from curable resin for use in forming a mold in the case of through holes of punched type) as well as protuberances corresponding to the optical waveguide cores; to apply over this master mold a curable resin layer for use in forming a mold such that the protuberances used for forming the through holes penetrate the resin layer (through holes of punched type) or such that the protuberances are concealed by the resin layer; to cure the thus-applied curable resin layer; and to subsequently remove the thus-cured resin layer from the master mold.

Further in relation to the method for forming waveguide cores, cores having cavities which are to form lenses can be fabricated in the substrate not only by means of the method mentioned above but also by means of a direct exposure method, an etching method, or the like.

Moreover, in the present invention, the structure where cavities are formed in respective optical waveguide cores may also be a structure where cavities penetrate through waveguide cores such that side faces of the cavities are enclosed by the waveguide cores and the tops and bottoms of the cavities are sealed by a clad; a structure where only the tops or bottoms of the cavities contact a clad; or a structure where the entire perimeters of the cavities are surrounded by the waveguide cores. Even in such a case, the structure where the cavities penetrate through the waveguide cores and the tops and bottoms of the waveguide cores contact a clad is more desirable, because signal light propagating through the waveguide cores is less susceptible to reflection at the upper or lower portions of the cavities.

FIRST EXAMPLE

A two-dimensional collimator lens (reference numeral 41 in FIG. 1)—which has a flat light-entrance plane and a concave light-exit plane and is formed from the air—is disposed in a core of an optical waveguide which is a square measuring 50 µm×50 µm and has a waveguide length of 10 mm, so as to become adjacent to the entrance end (the end of the optical waveguide). A semiconductor laser diode (a light source 70) causes a Gaussian beam having an angle of divergence of 0.07 rad and a wavelength of 850 nm to enter the entrance end by way of an optical fiber.

In order to ascertain the collimating effect of the hollow lens 41, a far-field pattern formed at the exit end is measured. For comparison, a linear waveguide not incorporating a hollow lens is created, and similar measurement is performed.

Consequently, the angle of divergence (a half angle) of the exiting light determined by measurement of the far-field pattern in the waveguide incorporating the hollow lens is 0.07 rad. In contrast, the angle of divergence (a half angle) of the exiting light determined in the waveguide not having any lens is 0.1 rad. From these results, the function of suppressing an angle of divergence implemented by the hollow lens is ascertained.

SECOND EXAMPLE

As shown in FIG. 7A, a thick resist film is applied over the Si substrate (master mold) 10 by means of spin coating. Subsequently, the substrate is pre-baked at 80° C. and exposed via a photomask. The substrate is developed, to thus fabricate the protuberances 11 of waveguide cores for converting a propagating direction and the hollow indentations 12 in the cores (the width of the core is 100 microns). The substrate is post-baked at 120° C., to thus create the optical waveguide cores and the master mold 10 used for forming the cavities in the cores.

Subsequently, after a mold-releasing agent had been applied over the master mold, thermosetting dimethyl siloxane resin (produced by Dow Corning Asia, SYLGARD 184) is caused to flow into the mold and left for a given period of time. The master mold is then subjected to vacuum defoaming for about ten minutes and heated at 120° C. for thirty minutes, to thus become cured. Subsequently, the resin is removed, to thus create the mold 20 having the indentations 21 corresponding to the main waveguide and the protuberances 22 corresponding to cavities (the thickness of the mold is 5 mm), as shown in FIG. 7B. Moreover, a bore having a diameter of 3 mm is formed in two locations at both ends of the main waveguide, thereby taking one bore as the core through hole (a port for filling) 23 and the other bore as the through hole (an inlet port) 24.

As shown in FIG. 7C, the mold 20 is brought into intimate contact with the film substrate 30 (Arton Film, which is produced by JSR Corporation and has a refractive index of 1.51) having a thickness of 188 μm. Subsequently, a core fill port 23 formed in the mold 20 is sufficiently filled with a UV radiation curing resin (exhibits a refractive index of 1.54 after having been cured) having a viscosity of 800 mPa·s. The resin is drawn from the suction port 24 by means of a pump, and the main waveguide except of the cavities is filled with the UV radiation curing resin.

Moreover, after having been cured upon exposure to UV radiation of 50 mW/cm$^2$ by way of the mold (the dimethyl siloxane resin) for five minutes, the mold 20 is removed, thereby creating waveguide cores (designated by reference numeral 40) having cavities (designated by reference numeral 41 in FIG. 1) on the Arton film (the clad substrate 30).

Next, a UV radiation curing resin for cladding purpose having a viscosity of 730 mPa·s and a refractive index of 1.51 is applied around the waveguide cores which have the cavities of air and are created on the Arton film. At that time, a cladding agent does not enter the cavities in the cores because of viscosity, which is a property of a polymer which remains unhardened. Subsequently, the UV radiation curing resin is exposed to UV radiation of 50 mW/cm$^2$ to thus be cured. Finally, the substrate is cut by a dicing saw in order to create the end portions of the optical waveguide.

The optical waveguide is created through the above processes. In the second example, the cavities forming lenses are created concurrently with formation of the waveguide cores. Therefore, a high manufacturing efficiency is achieved.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A lens-incorporating optical waveguide comprising:
   a core that includes a first portion having a light propagating end-face;
   a clad enclosing the core; and
   a collimating lens disposed in the first portion of the core, the lens being separated from the end-face by a core material so as to cross a propagating direction of light, wherein
   the core is substantially uniform except for including the lens,
   the lens-incorporating optical waveguide is a muitimode optical waveguide, and
   the clad encloses the lens within the core.

2. The lens-incorporating optical waveguide according to claim 1,
   wherein at least one of the core and the clad comprises a polymeric material.

3. The lens-incorporating optical waveguide according to claim 1,
   wherein the lens is a concave lens formed from a material having a refractive index which is lower than that of the core.

4. The lens-incorporating optical waveguide according to claim 1,
   wherein the first portion is in a vicinity of an end or a tip of the optical waveguide.

5. The lens-incorporating optical waveguide according to claim 1,
   wherein a cross sectional area of a plane of the lens perpendicular to the propagating direction of light is larger than a cross sectional area of a plane of a second portion of the core perpendicular to the propagating direction of light.

6. The lens-incorporating optical waveguide according to claim 1,
   wherein the lens is formed from a gas.

7. The lens-incorporating optical waveguide according to claim 1,
   wherein the lens is formed from a same material as that of the clad.

8. A method for manufacturing a lens-incorporating optical waveguide comprising:
   forming, on an underclad, a core which is arranged so as to cross a propagating direction of light and a cavity for a lens;
   disposing the cavity in a first portion of the core, the cavity being separated by a core material from a light propagating end-face of the first portion, the core being substantially uniform except for including the cavity;
   applying a curable clad material remaining uncured to a top and side faces of the core in an atmosphere of a gas;
   maintaining the gas in the cavity of the first portion of the core; and
   curing the curable clad material to thus trap the gas in the cavity.

9. A method for manufacturing a lens-incorporating optical waveguide comprising:
   forming, on an underclad, a core which is arranged so as to cross a propagating direction of light and a cavity for a lens;
   disposing the cavity in a first portion of the core, the cavity being separated by a core material from a light propagating end-face of the first portion, the core being substantially uniform except for including the cavity;
   applying a curable clad material remaining uncured to a top face and side faces of the core;
   defoaming a gas in the cavity in a depressurized environment to introduce the curable clad material into the cavity; and
   curing the curable clad material.

10. The method for manufacturing a lens-incorporating optical waveguide according to claim 8,
    wherein forming the core comprises:
    preparing a mold having an indentation corresponding to the core and a protuberance corresponding to the cavity;
    bringing the mold into contact with the underclad;
    filling the indentation of the mold with a curable resin for forming the core;
    curing the curable resin for forming the core; and
    removing the mold from the underclad.

11. The method for manufacturing a lens-incorporating optical waveguide according to claim 8,
    wherein the cavity has a shape of a concave lens.

12. The method for manufacturing a lens-incorporating optical waveguide according to claim 8,
    wherein the cavity is formed in a vicinity of an end or a tip of the optical waveguide.

13. The method for manufacturing a lens-incorporating optical waveguide according to claim 8,
    wherein a cross sectional area of a plane of the cavity perpendicular to the propagating direction of light is larger than a cross sectional area of a plane of a second portion of the core perpendicular to the propagating direction of light.

14. The method for manufacturing a lens-incorporating optical waveguide according to claim 9, wherein forming the core comprises:

preparing a mold having an indentation corresponding to the core and a protuberance corresponding to the cavity;

bringing the mold into contact with the underclad;

filling the indentation of the mold with a curable resin for forming the core;

curing the curable resin for forming the core; and removing the mold from the underclad.

15. The method for manufacturing a lens-incorporating optical waveguide according to claim 9, wherein the cavity has a shape of a concave lens.

16. The method for manufacturing a lens-incorporating optical waveguide according to claim 9, wherein the cavity is formed in a vicinity of an end or a tip of the optical waveguide.

17. The method for manufacturing a lens-incorporating optical waveguide according to claim 9, wherein a cross sectional area of a plane of the cavity perpendicular to the propagating direction of light is larger than a cross sectional area of a plane of a second portion of the core perpendicular to the propagating direction of light.

18. The lens-incorporating optical waveguide according to claim 1, wherein the clad surrounds the core, and surrounds the lens within the core, around a longitudinal direction of the core.

19. The lens-incorporating optical waveguide according to claim 1, wherein the clad substantially surrounds the core except at the light-propagating end-face and at another light-propagating end face.

\* \* \* \* \*